(12) United States Patent
Zeng et al.

(10) Patent No.: US 12,713,401 B2
(45) Date of Patent: Aug. 18, 2026

(54) TERMINAL OPERATION CONFIGURATION METHOD AND APPARATUS, AND ENERGY-SAVING METHOD AND APPARATUS FOR TERMINAL

(71) Applicant: VIVO MOBILE COMMUNICATION CO., LTD., Dongguan (CN)

(72) Inventors: Yu Zeng, Dongguan (CN); Siqi Liu, Dongguan (CN); Zichao Ji, Dongguan (CN); Huan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 346 days.

(21) Appl. No.: 18/221,431

(22) Filed: Jul. 13, 2023

(65) Prior Publication Data

US 2023/0362891 A1 Nov. 9, 2023

Related U.S. Application Data

(63) Continuation of application No. PCT/CN2022/071319, filed on Jan. 11, 2022.

(30) Foreign Application Priority Data

Jan. 15, 2021 (CN) ......................... 202110056173.5

(51) Int. Cl.

| | |
|---|---|
| ***H04W 72/02*** | (2009.01) |
| ***H04W 72/0446*** | (2023.01) |
| ***H04W 72/25*** | (2023.01) |

(52) U.S. Cl.

CPC ....... *H04W 72/02* (2013.01); *H04W 72/0446* (2013.01); *H04W 72/25* (2023.01)

(58) Field of Classification Search

CPC . H04W 72/02; H04W 76/28; H04W 72/0446; H04W 72/25; H04W 72/40;

(Continued)

(56) References Cited

U.S. PATENT DOCUMENTS

| | | | | |
|---|---|---|---|---|
| 2010/0277101 A1* | 11/2010 | Lin | .................... | H05B 41/3921 315/307 |
| 2020/0288402 A1* | 9/2020 | Nam | ..................... | H04W 72/23 |

(Continued)

FOREIGN PATENT DOCUMENTS

| | | |
|---|---|---|
| CN | 111246587 A | 6/2020 |
| CN | 111817826 A | 10/2020 |

OTHER PUBLICATIONS

International Search Report issued in corresponding International Application No. PCT/CN2022/071319, mailed Mar. 30, 2022, 6 pages.

(Continued)

*Primary Examiner* — Sai Aung
(74) *Attorney, Agent, or Firm* — IPX PLLC

(57) ABSTRACT

A terminal operation configuration method and apparatus, and an energy-saving method and apparatus for a terminal and a terminal are provided. The terminal operation configuration method includes: performing, by a terminal, a target operation on at least one of the following time resources: a first overlapping part between a sensing time in a first mechanism and an active time in a second mechanism, or a second overlapping part between the sensing time and an inactive time in the second mechanism. The first mechanism includes at least one of the following: the sensing time or a resource selection time.

16 Claims, 7 Drawing Sheets

(58) Field of Classification Search
CPC ............... H04W 92/18; H04W 72/044; H04W 72/0453; H04W 74/0808; H04W 72/12
See application file for complete search history.

(56) References Cited

U.S. PATENT DOCUMENTS

| | | | | |
|---|---|---|---|---|
| 2020/0401249 | A1* | 12/2020 | Shen | G06F 3/04166 |
| 2021/0022094 | A1* | 1/2021 | Luo | H04W 24/10 |
| 2022/0295514 | A1* | 9/2022 | Shin | H04W 52/0216 |
| 2023/0354271 | A1* | 11/2023 | Zeng | H04W 72/02 |
| 2024/0049342 | A1* | 2/2024 | Yang | H04W 52/0235 |
| 2024/0073907 | A1* | 2/2024 | Hu | H04W 72/21 |
| 2024/0340889 | A1* | 10/2024 | Hugl | H04W 72/21 |
| 2024/0381482 | A1* | 11/2024 | Deghel | H04L 5/0053 |
| 2025/0089122 | A1* | 3/2025 | Maamari | H04W 52/0216 |
| 2025/0096995 | A1* | 3/2025 | Abotabl | H04L 5/14 |

OTHER PUBLICATIONS

Huawei et al, Physical layer impacts of sidelink DRX, 3GPP TSG RAN WG1 #102-e, R1-2006402, Aug. 17-Aug. 28, 2020, 4 pages.
Ericsson, Interaction between partial sensing and DRX, 3GPP TSG-RAN WG2 Meeting #112-e, R2-2009232, Oct. 26-Nov. 13, 2020, 5 pages.
Nokia et al, Discussion of sidelink resource allocation for power saving, 3GPP TSG RAN WG1 Meeting #102-e, R1-2005500, Aug. 17-Aug. 28, 2020, 3 pages.
Vivo, Uu/SL DRX impact to resource allocation mode 1 and mode 2, 3GPP TSG-RAN WG2 Meeting #112 electronic, R2-2009834, Nov. 2-Nov. 13, 2020, 6 pages.

* cited by examiner

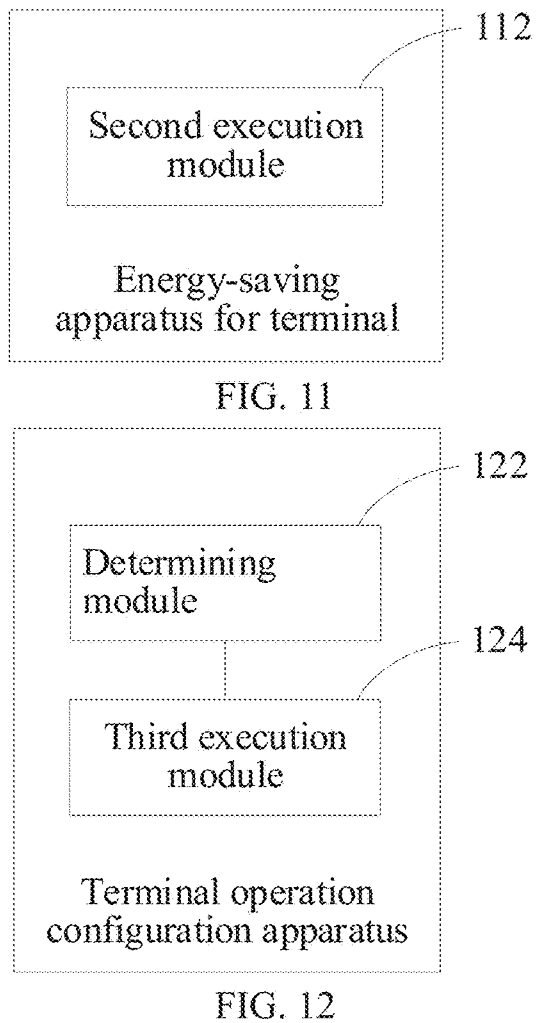
FIG. 11
FIG. 12
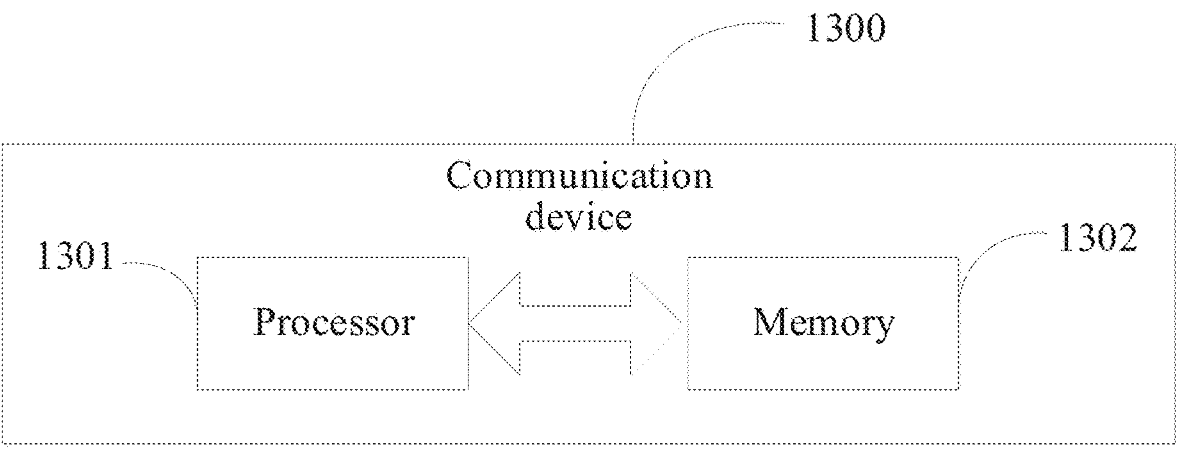
FIG. 13

TERMINAL OPERATION CONFIGURATION METHOD AND APPARATUS, AND ENERGY-SAVING METHOD AND APPARATUS FOR TERMINAL

CROSS-REFERENCE TO RELATED APPLICATIONS

This application is a continuation of International Application No. PCT/CN2022/071319, filed on Jan. 11, 2022, which claims priority to Chinese Patent Application No. 202110056173.5 filed on Jan. 15, 2021. The entire contents of each of the above-referenced applications are expressly incorporated herein by reference.

TECHNICAL FIELD

This application belongs to the field of communication technologies, and specifically, relates to a terminal operation configuration method and apparatus, and an energy-saving method and apparatus for a terminal.

BACKGROUND

Currently, sidelink Discontinuous Reception (DRX) is introduced to save power on a New Radio (NR) Sidelink (SL), and a sensing mechanism is further required for a terminal. However, when a User Equipment (UE) is configured with both DRX and sensing, there are some problems to be resolved when the two mechanisms work together or independently. For example, when DRX and sensing work together, it is assumed that sensing is available for the UE only in the DRX on duration or the DRX active time. If a sensing window is not in or not completely in the DRX on duration or DRX active time, a Sidelink Control Information (SCI) may not be received, and thus sensing cannot be performed. Total energy consumption at this time may be smaller than that in a case in which only sensing is allowed and DRX is not supported. However, due to the reduced time of sensing, selected resources are more likely to conflict with resources of other users, resulting in a decrease in reliability.

When DRX and sensing are performed independently, that is, when the sensing window is not in or not completely in the DRX on duration or DRX active time, sensing can still be performed for the terminal in the sensing window. In this case, the UE may not be capable of achieving optimal power saving, that is, overall power consumption is greater than power consumption of any mechanism operating alone. Further, as shown in FIG. 1, transient RF switching between sensing and DRX may cause the UE not be capable of entering a deep sleep (due to insufficient time) after one of the mechanisms ends, potentially increasing power consumption.

SUMMARY

Embodiments of this application provide a terminal operation configuration method and apparatus, and an energy-saving method and apparatus for a terminal.

According to a first aspect, a terminal operation configuration method is provided, including: performing, by a terminal, a target operation on at least one of the following time resources: a first overlapping part between a sensing time in a first mechanism and an active time in a second mechanism, and a second overlapping part between the sensing time and an inactive time in the second mechanism, where the first mechanism includes at least one of the following: the sensing time and a resource selection time.

According to a second aspect, an energy-saving method for a terminal is provided, including: performing, by the terminal, a first operation in at least one of the following manners: network configuration, pre-configuration, determining by the terminal, indication by another device, and protocol agreement, where the first operation includes at least one of the following: discarding at least some sensing times in a first mechanism, configuring a resource allocation manner, configuring a configuration parameter for the sensing time, and configuring a configuration parameter for a second mechanism; and the first mechanism includes at least one of the following: the sensing time and a resource selection time; and the second mechanism includes the active time and an inactive time.

According to a third aspect, a terminal operation configuration method is provided, including: determining, by a terminal, a target time, where the target time is indicated by a higher layer of the terminal to a physical layer of the terminal; and executing, by the terminal, a target mechanism at the target time, where the target mechanism includes at least one of the following: a first mechanism and a third mechanism; and the first mechanism includes at least one of the following: a sensing time and a resource selection time; and the third mechanism includes random selection.

According to a fourth aspect, a terminal operation configuration apparatus is provided, including: a first execution module, configured to perform a target operation on at least one of the following time resources: a first overlapping part between a sensing time in a first mechanism and an active time in a second mechanism, and a second overlapping part between the sensing time and an inactive time in the second mechanism, where the first mechanism includes at least one of the following: the sensing time and a resource selection time.

According to a fifth aspect, an energy-saving apparatus for a terminal is provided, including: a second execution module, configured to perform a first operation in at least one of the following manners: network configuration, pre-configuration, determining by the apparatus, indication by another device, and protocol agreement, where the first operation includes at least one of the following: discarding at least some sensing times in a first mechanism, configuring a resource allocation manner, configuring a configuration parameter for the sensing time, and configuring a configuration parameter for a second mechanism; and the first mechanism includes at least one of the following: the sensing time and a resource selection time; and the second mechanism includes the active time and an inactive time.

According to a sixth aspect, a terminal operation configuration apparatus is provided, including: a determining module, configured to determine a target time, where the target time is indicated by a higher layer of a terminal to a physical layer of the terminal; and a third execution module, configured to execute a target mechanism at the target time, where the target mechanism includes at least one of the following: a first mechanism and a third mechanism; and the first mechanism includes at least one of the following: a sensing time and a resource selection time; and the third mechanism includes random selection.

According to a seventh aspect, a terminal is provided, including a processor, a memory, and a program or an instruction stored in the memory and executable on the processor, where when the program or the instruction is executed by the processor, the steps of the method according to the first aspect are implemented, or the steps of the method according to the second aspect are implemented, or the steps of the method according to the third aspect are implemented.

According to an eighth aspect, a readable storage medium is provided, where the readable storage medium stores a program or an instruction, and when the program or the instruction is executed by a processor, the steps of the method according to the first aspect are implemented, or the steps of the method according to the second aspect are implemented, or the steps of the method according to the third aspect are implemented.

According to a ninth aspect, a chip is provided, where the chip includes a processor and a communication interface, the communication interface is coupled to the processor, and the processor is configured to run a network side device program or instruction to implement the method according to the first aspect, or implement the method according to the second aspect, or implement the method according to the third aspect.

According to a tenth aspect, a computer program product is provided, where the computer program product is stored in a non-transient storage medium, and the computer program product is executed by at least one processor to implement the method according to the first aspect, or the computer program product is executed by at least one processor to implement the method according to the second aspect, or the computer program product is executed by at least one processor to implement the method according to the third aspect.

In the embodiments of this application, behaviors of the terminal are specified in the first overlapping part between the sensing time in the first mechanism and the active time in the second mechanism and the second overlapping part between the sensing time and the inactive time in the second mechanism, so that a reduction in sensing times caused by a case that the sensing times are not in the active time can be avoided.

BRIEF DESCRIPTION OF THE DRAWINGS

FIG. 11 is a schematic structural diagram of an energy-saving apparatus for a terminal according to an embodiment of this application;

FIG. 12 is a second schematic structural diagram of a terminal operation configuration apparatus according to an embodiment of this application;

FIG. 13 is a first schematic structural diagram of a terminal according to an embodiment of this application.

DETAILED DESCRIPTION

The technical solutions in embodiments of this application are clearly described in the following with reference to the accompanying drawings in the embodiments of this application. Apparently, the described embodiments are merely some rather than all of the embodiments of this application. All other embodiments obtained by a person of ordinary skill in the art based on the embodiments of this application fall within the protection scope of this application.

In this specification and the claims of this application, the terms “first”, “second”, and so on are intended to distinguish similar objects, but do not necessarily indicate a specific order or sequence. It should be understood that the data termed in such a way is interchangeable in proper circumstances, so that the embodiments of this application can be implemented in other sequences than the sequence illustrated or described herein. In addition, the objects distinguished by “first” and “second” are usually of one type, and there is no limitation on quantities of the objects. For example, there may be one or more first objects. In addition, “and/or” in this specification and the claims indicate at least one of the connected objects, and the character “/” usually indicates an “or” relationship between the associated objects.

It should be noted that, the technologies described in the embodiments of this application are not limited to a Long Term Evolution (LTE)/LTE-Advanced (LTE-A) system, and can be further used in other wireless communication systems, such as Code Division Multiple Address (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms “system” and “network” in the embodiments of this application are often used interchangeably, and the described technologies can be used not only for the above-mentioned systems and radio technologies, but also for other systems and radio technologies. The following description describes an NR system for exemplary purposes, and uses NR terms in most of the following descriptions, but these technologies are also applicable to applications other than the NR system application, such as a 6$^{th}$ Generation (6G) communication system.

Figure 1:
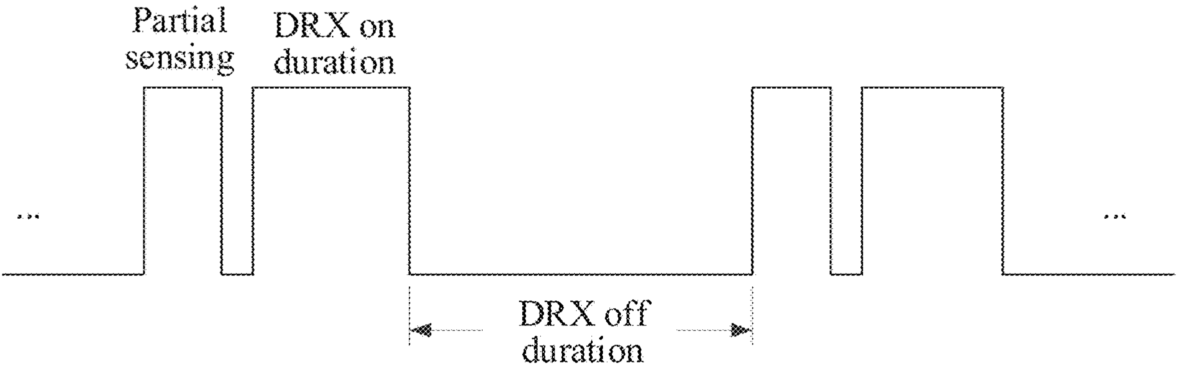
FIG. 1 is a schematic sensing diagram when DRX and sensing are independently performed in the prior art.
Figure 2:
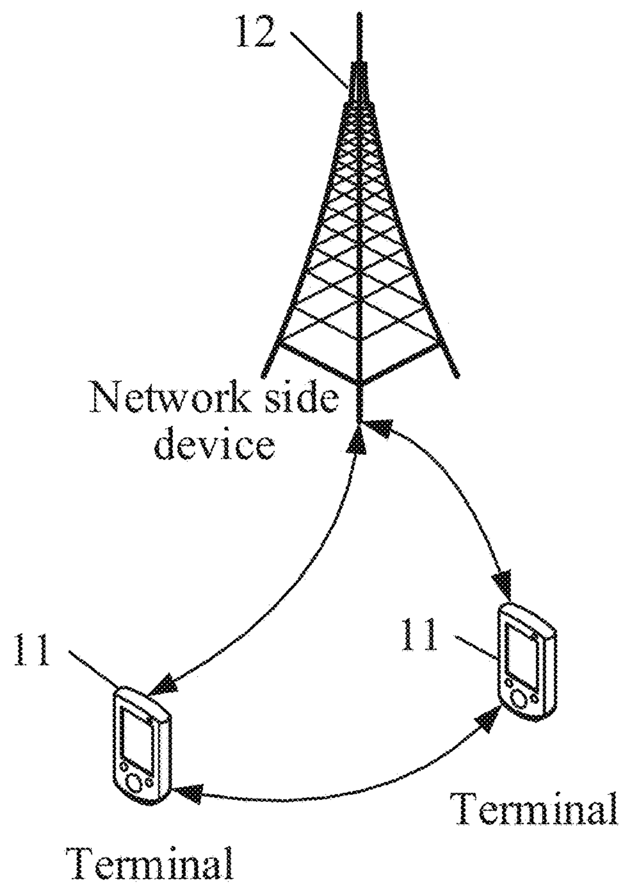
FIG. 2 is a block diagram of a wireless communication system according to an embodiment of this application.

FIG. 2 is a block diagram of a wireless communication system to which an embodiment of this application is applicable. The wireless communication system includes a terminal 11 and a network side device 12. The terminal 11 may also be referred to as a terminal device or a UE. The terminal 11 may be a mobile phone, a tablet computer, a laptop computer or referred to as a notebook computer, a Personal Digital Assistant (PDA), a palmtop computer, a netbook, an Ultra-Mobile Personal Computer (UMPC), a Mobile Internet Device (MID), a wearable device, or Vehicle User Equipment (VUE), Pedestrian User Equipment (PUE), and other terminal-side devices. The wearable device includes bands, headsets, glasses, or the like. It should be noted that, a specific type of the terminal 11 is not limited in this embodiment of this application. The network side device 12 may be a base station or a core network. The base station may be referred to as a Node B, an evolved Node B, an access point, a Base Transceiver Station (BTS), a radio base station, a radio transceiver, a Basic Service Set (BSS), an Extended Service Set (ESS), a node B, an evolved Node B (eNB), a home node B, a home evolved node B, a Wireless Local Area. Network (WLAN) access point, a Wireless Fidelity (WiFi) node, a Transmission and Reception Point (TRP), or some other suitable term in the field, provided that a same technical effect is achieved. The base station is not limited to a specific technical term. It should be noted that, in this embodiment of this application, only a base station in an NR system is used as an example, but the specific type of the base station is not limited.

First, related terms in the embodiments of this application are explained and described.

I. Discontinuous Reception of LTE and NR Uu Interfaces

Figure 3:
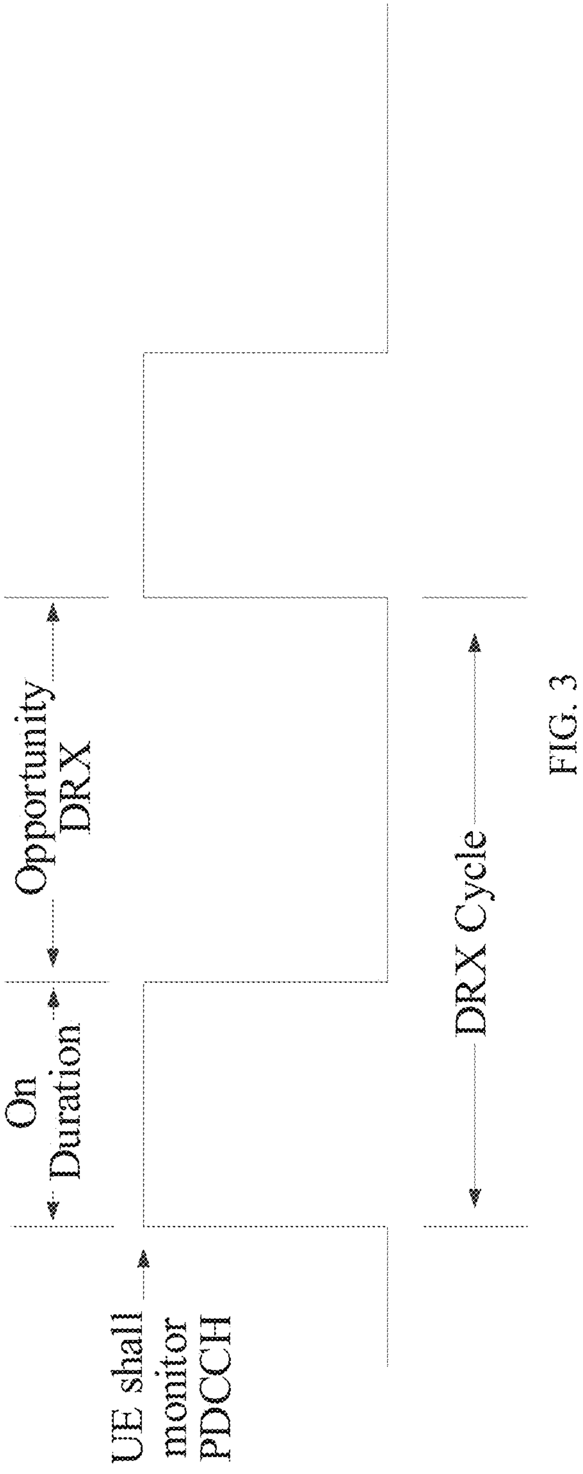
FIG. 3 is a schematic diagram of a DRX cycle according to an embodiment of this application.

A DRX mechanism is introduced in both LTE and NR, to save power for UE by configuring the DRX on and DRX off time. As shown in FIG. 3, an on duration period is a DRX on interval. If the UE is not scheduled in the on duration period, the UE enters an off period of a DRX cycle.

During the configuration of DRX, onDurationTimer (an active timer), drx-InactivityTimer (an inactivity timer), drx-RetransmissionTimer (a retransmission timer), longDRX-CycleStartOffset, and other parameters are configured.

After the UE is configured with DRX, if decoding of sent or received data fails, the UE needs to enter an active time to monitor a control channel and wait for retransmission scheduled by a network. In the On Duration period, if the UE is scheduled and receives data in a slot, the UE is likely to continue to be scheduled in the next few slots. Therefore, each time when the UE is scheduled for initial transmission of data, the timer drx-inactivityTimer is started or restarted, and the UE is to remain in an active state until the timer expires.

For downlink data reception, the UE receives downlink data transmission indicated by a Physical Downlink Control Channel (PDCCH) and feeds back information about a Hybrid Automatic Repeat reQuest (HARQ), and then starts a downlink return timer (HARQ Round Trip Time (RTT) Timer) to a corresponding HARQ process, where an RTT is a round trip time delay. If the HARQ RTT Timer expires, and data of the HARQ process is not successfully decoded, the UE starts the retransmission timer (drx-Retransmission-Timer), monitors the PDCCH, and waits for transmission.

For uplink data transmission, the UE starts an uplink return timer HARQ RTT Timer for a corresponding HARQ process after receiving the uplink data transmission indicated by the PDCCH. After the HARQ RTT Timer expires, the UE starts the retransmission timer (drx-ULRetransmissionTimer), enters the active state to monitor the PDCCH, and waits for transmission scheduled by the network.

II. LTE SL Sensing

The basic working principle of LTE sidelink sensing is as follows:

A measurement is performed within a sensing window, and a Scheduling Assignment (SA) and an interference measurement are performed within each sensing Transmission Time Interval (TTI).

Figures 4, 5:
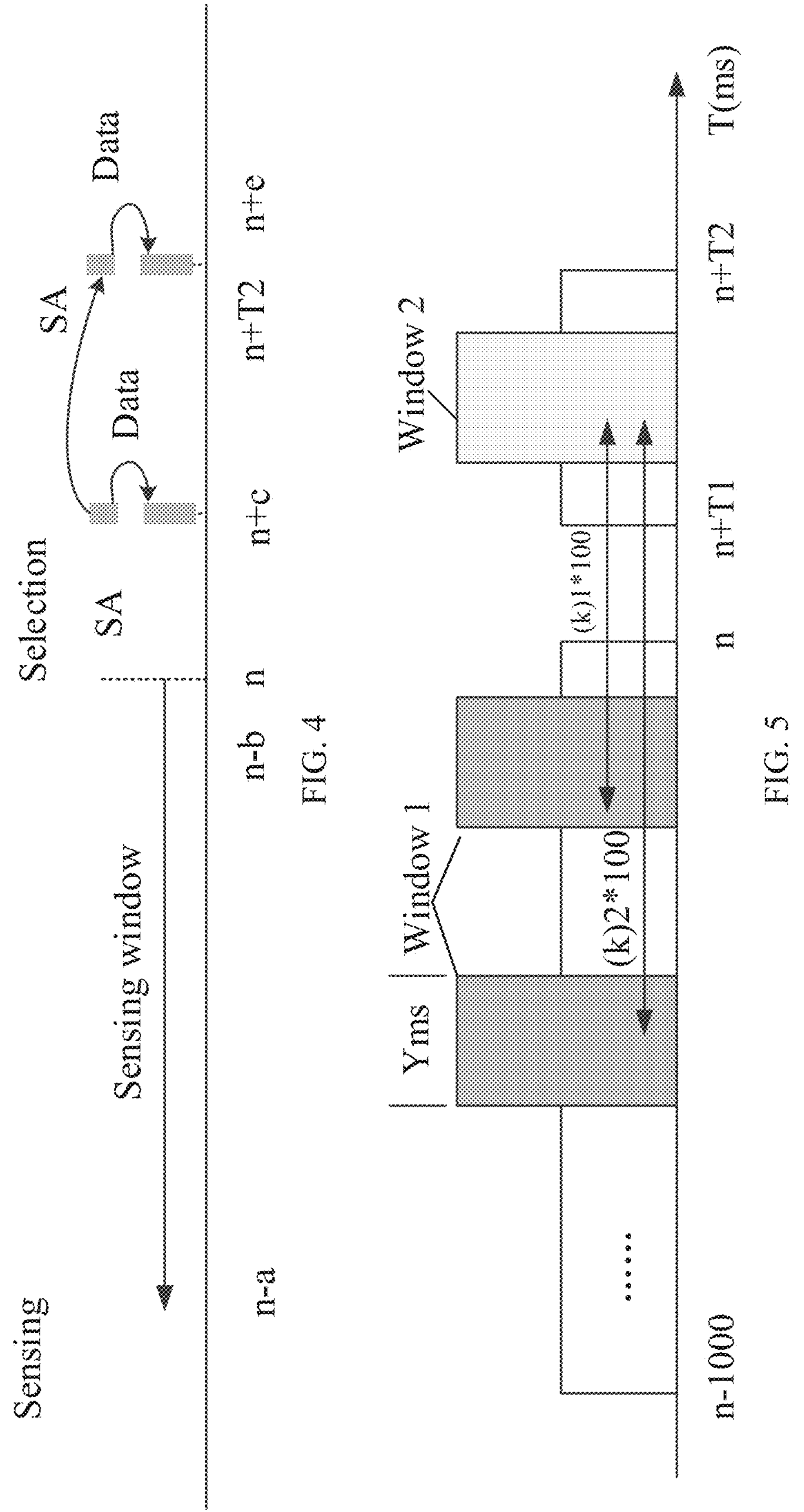
FIG. 4 is a schematic sensing diagram of an LTE sidelink according to an embodiment of this application.
FIG. 5 is a schematic partial sensing diagram of LTE according to an embodiment of this application.

Based on FIG. 4, the UE performs resource selection according to the following steps:

Step 1. Exclude resources for the UE to send data.

Step 2. The terminal demodulates a received SA to obtain resources reserved by other UEs, where the resources reserved by other UEs are excluded.

Step 3. Perform energy sensing within a sensing window, measure a Reference Signal Strength Indication (RSSI), and exclude a resource with large interference according to a measurement result.

Step 4. Randomly select a subframe from 20% resources with the smallest interference in a selection window, for resource reservation of a cycle.

III. Partial Sensing in LTE SL

In LTE vehicle wireless communication technology (Vehicle To Everything (V2X)), partial sensing is designed mainly for saving power, and for supporting Pedestrian to Vehicle (P2V) communication. PUE supports two modes of resource selection. One is random resource selection. The other mode is performing partial sensing first, selecting a resource based on a result of the partial sensing, and performing semi-persistent resource reservation. The PUE selects which mode is configured by Radio Resource Control (RRC). When it is configured by the RRC to support two modes of resource selection, a PUE implementation determines which resource selection manner is to be used.

Based on FIG. 5, the terminal performs partial sensing and performs resource sensing in the following manner:

A PUE sensing window is window 1 within a range of [n−1000, n], a length Y and k are parameters configured by RRC, and a value of k may be in a range of {1, 2, 3, . . . , 10}. Window 2 within [n+T1, n+T2] is a PUE selection window configured by a higher layer. The PUE senses, in the window 1, SCI sent by another terminal, and infers, according to the sensed SCI and a reservation period, a resource reservation status of the another terminal within the window 2. The PUE may exclude, according to these pieces of information, a resource that does not meet a condition in the selection window. At least 20% (20% of the length Y of the window) of the remaining resources are selected as a candidate resource set and reported to a Media Access Control (MAC) layer. The MAC layer randomly selects a resource from the candidate resource set as a candidate resource for the PUE. The PUE performs periodic reservation on the selected resource, and the reservation period is indicated in the SCI.

IV. Random Selection in SL

If a user performs random selection, a resource is randomly selected within the selection window in FIG. 5, and no sensing is required.

V. Sensing in NR SL

In a resource allocation mode of Mode 2, resource selection based on sensing is supported. The principle is similar to that of the sensing mechanism in LTE SL mode 4. An exemplary working mode is as follows: (1) Transmitting (TX) UE determines a resource selection window after resource selection is triggered. (2) Before the resource selection, the UE needs to determine a candidate resource set for the resource selection, and compares Reference Signal Received Power (RSRP) measured on a resource within the resource selection window with a corresponding RSRP threshold, where if the RSRP is lower than the RSRP threshold, the resource may be added to the candidate resource set. (3) After determining the resource set, the UE randomly selects a transmission resource from the candidate resource set. In addition, the UE may reserve a transmission resource for subsequent transmission in the current transmission.

In Release 16 (Rel-16) NR SL, the TX UE performs resource reservation (the reservation is divided into periodic reservation and aperiodic reservation) on resources allocated by the TX UE, and resources are reserved for future use in Physical Sidelink Control Channel (PSCCH) or Physical Sidelink Shared Channel (PSSCH) transmission. The aperiodic reservation may be implemented through a Time resource assignment field in SCI, and the reserved resource may be used at least for the transmission of a same TB. The periodic reservation may be implemented through a Resource reservation period field in SCI, and a periodic resource reserved in a current period may be used for the transmission of a next TB.

VI. SL Resource Pre-Emption in NR SL

The resource allocation mode of Mode 2 supports a resource pre-emption mechanism. The mechanism is briefly described as follows: A resource reserved/selected by one UE overlaps a resource reserved/selected by another UE with a higher service priority. If an SL-RSRP measurement value of the UE on the relevant resource is greater than an associated SL-RSRP threshold, the UE triggers resource re-selection. The service priority and the SL-RSRP threshold are determined by TB transmission on the resource.

Figures 6, 7:
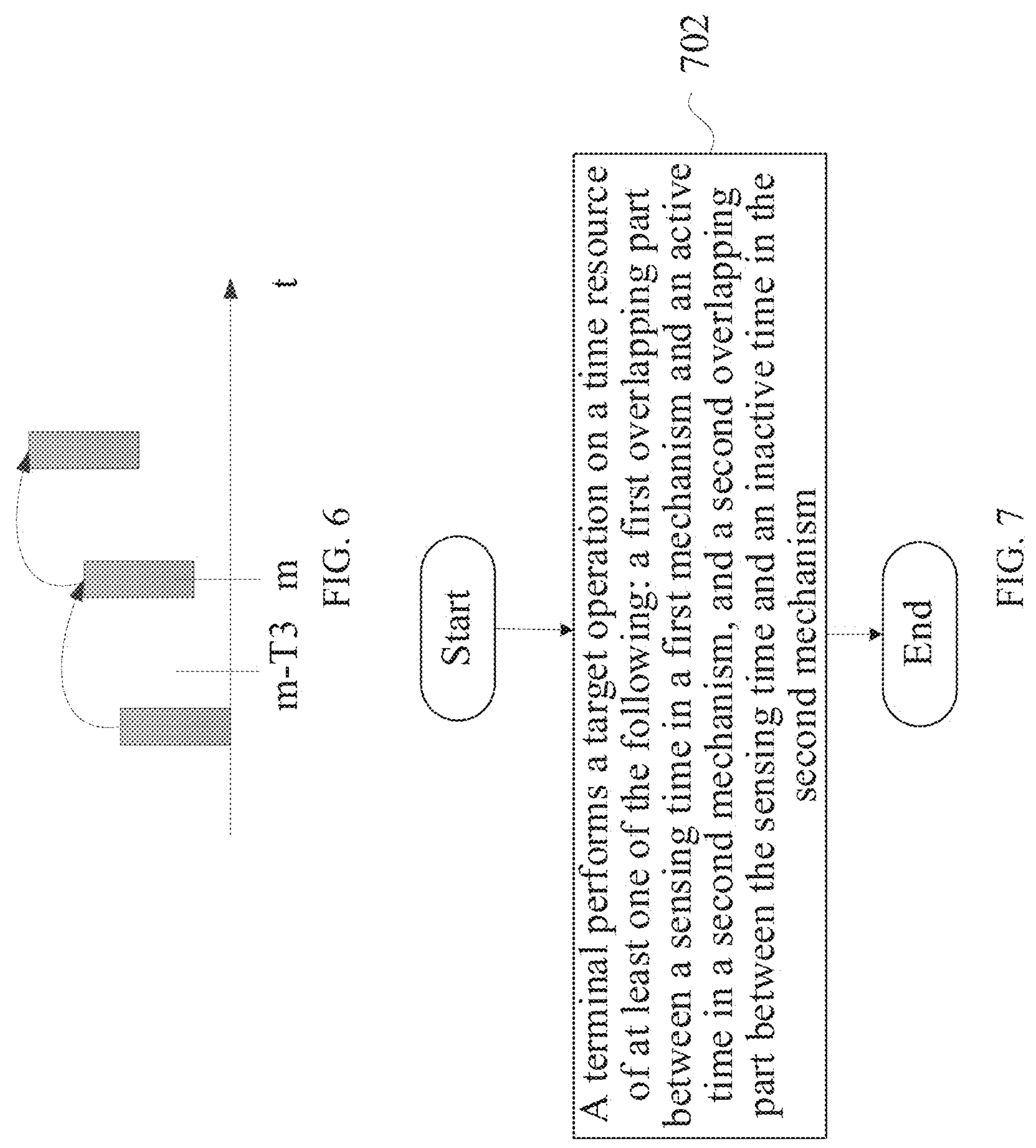
FIG. 6 is a schematic diagram of SL resource pre-emption according to an embodiment of this application.
FIG. 7 is a first flowchart of a terminal operation configuration method according to an embodiment of this application.

As shown in FIG. 6, in order for the UE to determine whether a reserved or selected resource (PSCCH/PSSCH resource) is pre-empted, the UE re-evaluates the resource selection at least at a moment "m−T3", where a moment "m" is a moment at which the resource is located or a moment at which resource reservation information is sent, and T3 includes at least duration of resource selection processing by the UE.

VII. Cast Type (Forced Type Conversion)

The NR sidelink supports three transmission nodes: broadcast, multicast, and unicast. The multicast in the NR sidelink supports two use cases: connection-based multicast and connection-less multicast. The connection-based multicast means that a connection is established between multi cast UEs. The connection-less mode refers to a scenario in which multi cast UE does not know other UEs in the group and no connection is established. For the multicast case, a plurality of receivers support two mechanisms during HARQ feedback:

Mechanism 1 (feed back only a NACK, or a connection-less mechanism connectionless). If the data is received but cannot be decoded, feed back a NACK, and give no feedback in other cases. If the receivers do not receive the NACK in this case, it is considered that all the receivers have successfully received and decoded the data. However, this mechanism has a disadvantage that a transmitter may confuse the two case of successful reception of the data and unsuccessful reception of SCI by the receiver, that is, although the receiver does not successfully receive the SCI and the data, the transmitter considers that the receiver has successfully received the SCI and the data. This manner is applicable to a connection-less multicast scenario.

Mechanism 2 (feed back an ACK/NACK, or a connection-based mechanism connection-based): If the data is received but cannot be decoded or SCI is received but the data is not received, feed back a NACK, or if the data is received and correctly decoded, feed back an ACK. In this case, if a transmitter receives a NACK sent by a transmit end user, or does not receive an ACK or a NACK, the transmitter considers that the transmission sent to the terminal fails, or if the transmitter receives an ACK sent by a transmit end, the transmitter considers that the transmission sent to the terminal succeeds. This manner is applicable to a connection-based multi cast scenario.

In addition, it should be further noted that:

(1) The DRX active time is a time (an active period) during which the UE monitors/receives/demodulates/measures a channel/signal/signaling, where the channel/signal/signaling may be at least one of the following: a PSFCH, a PSSCH, a Physical Sidelink Broadcast Channel (PSBCH), a Physical Sidelink Feedback Channel (PSFCH), SCI, a Sidelink Synchronization Signal and PBCH Block (S-SSB), and a Reference Signal (RS), and includes, for example, at least one of DRX on duration, a running time of an inactivity timer, and a running time of a retransmission timer.

(2) The DRX inactive time is a time during which the UE does not monitor/receive/demodulate/measure a channel/signal/signaling (that is, a dormant period), where the channel/signal/signaling may be at least one of the following: a PSFCH, a PSFCH, a PSFCH, a PSFCH, SCI, an S-SSB, and an RS, and includes, for example, at least one of DRX off duration and a running time of an RTT timer.

(3) The sensing time may be replaced with other expressions in the art as follows: a sensing window, a sensing moment, a sensing range, a sensing slot set, a sensing resource set, and a sensing sample.

(4) T1/T2: T1 and T2 are respectively defined as distances of a resource selection (re-selection) trigger moment n from upper and lower boundaries of a time interval $[n+T_1, n+T_2]$ (that is, a resource selection time can be determined within this time interval) including a resource selection time, values thereof are both determined by the UE for implementation, and $$0 \le T_1 \le T^{SL}_{proc,1},\ T_{2min} \le T_2 \le$$

remaining packet budget (in terms of slots) needs to be met.

$$T^{SL}_{proc,1}$$

is a prefigured value, and $T_{2min}$ is a higher-layer indication value. When $T_{2min}$>remaining packet budget, $T_2$=remaining packet budget (budget of remaining data packets).

A terminal operation configuration method provided in the embodiments of this application is described in detail below through embodiments and application scenarios thereof with reference to the accompanying drawings.

As shown in FIG. 7, an embodiment of this application provides a terminal operation configuration method. The method includes the following steps:

Step 702. A terminal performs a target operation on at least one of the following time resources: a first overlapping part between a sensing time in a first mechanism and an active time in a second mechanism, and a second overlapping part between the sensing time and an inactive time in the second mechanism, where the first mechanism includes at least one of the following: the sensing time and a resource selection time.

It can be learned from the foregoing step 702 that, behaviors of the terminal are specified in the first overlapping part between the sensing time in the first mechanism and the active time in the second mechanism and the second overlapping part between the sensing time and the inactive time in the second mechanism, so that a reduction in sensing times caused by a case that the sensing times are not in the active time can be avoided.

In an implementation of this embodiment of this application, the performing, by a terminal, a target operation on a time resource in step 702 may include at least one of the following:

(1) performing, by the terminal, a first target operation on a target resource on the time resource;

(2) performing, by the terminal, a measurement on the time resource, where it should be noted that, the measurement in this embodiment of this application may refer to an SL measurement;

(3) demodulating, by the terminal, level 1 sidelink control information SCI on the time resource;

(4) demodulating, by the terminal, level 2 SCI on the time resource, where the level 1 SCI is associated with the level 2 SCI;

(5) receiving, by the terminal, a sidelink synchronization signal block SL SSB on the time resource; and (6) sending, by the terminal, the SL SSB on the time resource.

It should be noted that, The demodulating, by the terminal, level 1 SCI and level 2 SCI on the time resource in this embodiment of this application may be that the terminal is to demodulate or may demodulate or is allowed to demodulate level 1 SCI and level 2 SCI on the time resource.

The target resource involved in this embodiment of this application includes at least one of the following: a physical sidelink control channel PSCCH, a physical sidelink shared channel PSCCH, a physical sidelink broadcast channel PSBCH, a physical sidelink feedback channel PSFCH, sidelink control information SCI, a synchronization signal block SSB, and a reference signal RS.

In addition, the first target operation in this embodiment of this application includes at least one of the following: receiving, sending, monitoring, and demodulating.

In an implementation of this embodiment of this application, the measurement in this embodiment of this application includes at least one of the following: a channel state information reference signal CSI-RS measurement and a reference signal received power RSRP measurement. It should be noted that, the RSRP in this embodiment of this application includes at least one of the following: L1-RSRP and L3-RSRP.

In an implementation of this embodiment of this application, the performing, by the terminal, a measurement on the time resource in this embodiment of this application may be: determining, by the terminal according to configuration information, whether to perform the measurement at the sensing time. If the measurement in this embodiment of this application refers to the SL measurement, the determining, according to configuration information, whether to perform the SL measurement within the sensing time is configurable.

In an implementation of this embodiment of this application, in a case that the time resource is the second overlapping part, in this embodiment of this application, an operation of the terminal on the second overlapping part is consistent with an operation of the terminal on the first overlapping part; or an operation of the terminal on the second overlapping part is inconsistent with an operation of the terminal on the first overlapping part. The operation on the second overlapping part and the consistent operation on the first overlapping part may be the operations in the foregoing (1) to (6).

In an implementation of this embodiment of this application, in a case that the time resource is the second overlapping part, the operation on the second overlapping part and the inconsistent operation on the first overlapping part, that is, the performing, by the terminal, a target operation on the time resource includes at least one of the following:

(1) demodulating, by the terminal, only level 1 SCI on the second overlapping part;

(2) skipping receiving, by the terminal, an SL SSB on the second overlapping part;

(3) skipping sending, by the terminal, an SL SSB on the second overlapping part;

(4) skipping performing, by the terminal, a measurement on the second overlapping part; and (5) skipping performing, by the terminal, sensing on the second overlapping part.

It should be noted that, the skipping performing, by the terminal, sensing on the second overlapping part means that the terminal considers that the second overlapping part is invalid.

As can be learned from this, the target operation to be performed by the terminal is specified in each of the first overlapping part and the second overlapping part, that is, an operation to be performed by the terminal on a sidelink service within the sensing time is specified, thereby ensuring the reliability of the sidelink service.

In another implementation of this embodiment of this application, in a case that the time resource is the second overlapping part, the terminal performs sensing on the time resource in a case that at least one of the following is satisfied:

the sensing time is associated with an aperiodic service, the sensing time is a triggered sensing time, the sensing time is an extended sensing time, the sensing time is associated with pre-emption, the sensing time is associated with re-evaluation, the sensing time is before the active time in the second mechanism, and the sensing time is associated with a resource selection time corresponding to the active time in the second mechanism.

It can be learned that, in the foregoing case, it is further clarified that the terminal can perform sensing on the time resource, thus ensuring that the sensing time is not reduced, thereby avoiding a conflict between a selected resource and a resource of another terminal, and improving the reliability of the sidelink service.

Figures 8, 9, 10:
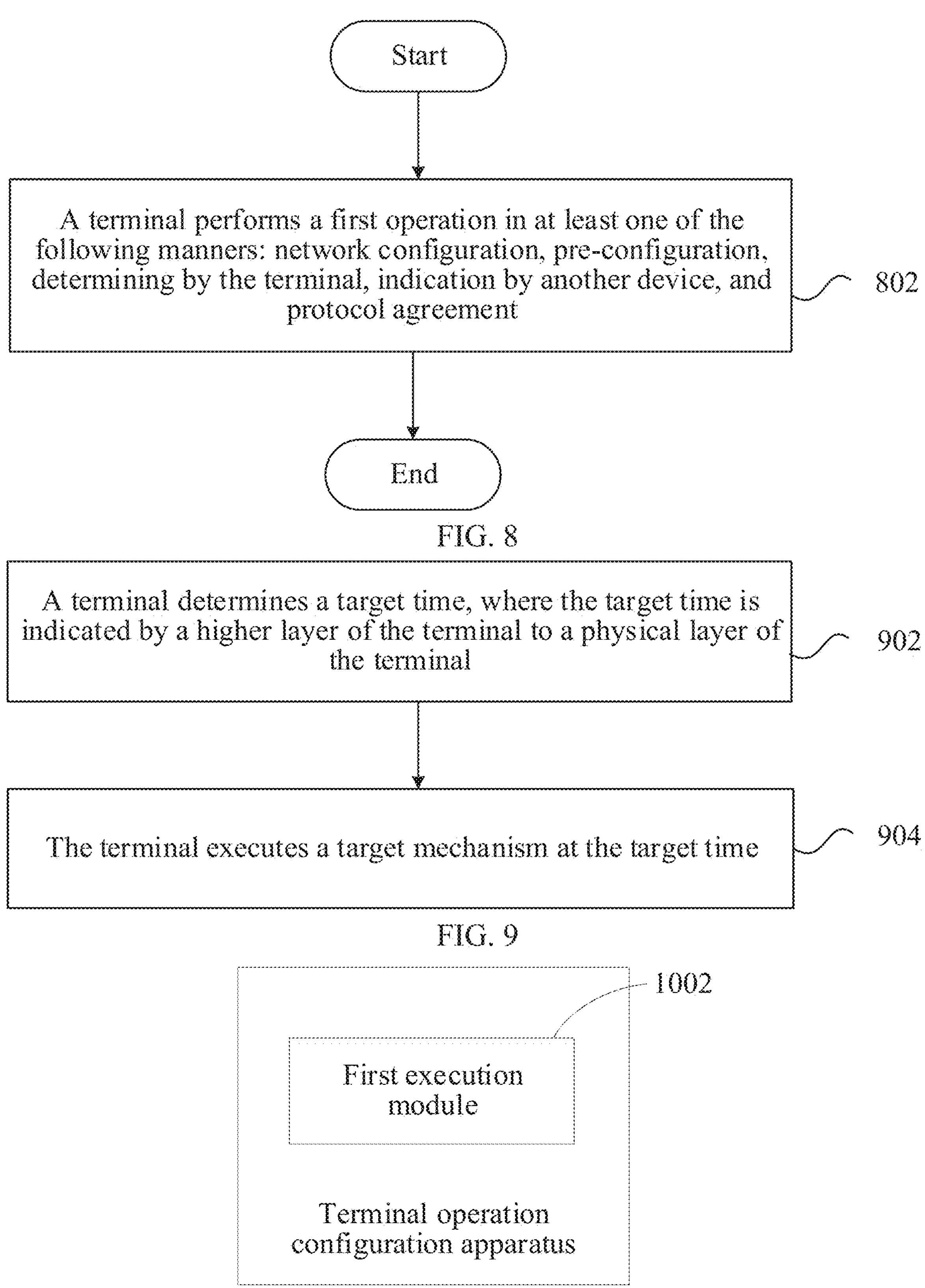
FIG. 8 is a flowchart of an energy-saving method for a terminal according to an embodiment of this application.
FIG. 9 is a second flowchart of a terminal operation configuration method according to an embodiment of this application.
FIG. 10 is a first schematic structural diagram of a terminal operation configuration apparatus according to an embodiment of this application.

In another embodiment of this application, an energy-saving method for a terminal is provided. As shown in FIG. 8, the method includes the following steps:

Step 802. The terminal performs a first operation in at least one of the following manners: network configuration, pre-configuration, determining by the terminal, indication by another device, and protocol agreement, where the first operation includes at least one of the following: discarding at least some sensing times in a first mechanism, configuring a resource allocation manner, configuring a configuration parameter for the sensing time, and configuring a configuration parameter for a second mechanism; and the first mechanism includes at least one of the following: the sensing time and a resource selection time; and the second mechanism includes an active time and an inactive time.

Through the foregoing step 802, the terminal may determine to perform the first operation in at least one of the following manners: network configuration, pre-configuration, determining by the terminal, indication by another device, and protocol agreement. The first operation includes at least one of the following: discarding at least some sensing times in a first mechanism, configuring a resource allocation manner, configuring a configuration parameter for the sensing time, and configuring a configuration parameter for a second mechanism. The energy saving of the terminal is achieved through the selection of the sensing time, the switching of resource allocation mechanisms, and the adjustment of the sensing time, the active time, and the inactive time.

It should be noted that, the indication by another device in this embodiment of this application means that the terminal receives an indication from the another device to perform the first operation in the following case: the another device indicates the terminal not to perform transmission within a particular period of time, where there is no SCI transmission at a corresponding time domain location in this case, and the terminal needs to discard at least some sensing times; or if terminals negotiate an agreement that initial transmission is not earlier than a moment m, the terminal discards sensing times before the moment m or before the moment m and an offset value (that is, there is no information transmission at the corresponding time domain location, and therefore, no terminal performs resource reservation through SCI).

In an implementation of this embodiment of this application, the manner of discarding at least some sensing times in the first mechanism involved in this embodiment of this application may include at least one of the following:

(1) discarding M sensing times after a Channel busy Ratio (CBR) measurement window when a CBR is lower than a first preset threshold, where it should be noted that, the M sensing times may be continuous or discontinuous; and (2) discarding N sensing times after the CBR measurement window when a Channel Occupancy Ratio (CR) is lower than a second preset threshold, where it should be noted that, the N sensing times may be continuous or discontinuous.

M and N are positive integers.

In an implementation of this embodiment of this application, a manner of discarding at least some sensing times in the first mechanism in this embodiment of this application may further include at least one of the following:

(1) the terminal considers that the sensing time does not exist;

(2) the terminal considers that the sensing time is invalid;

(3) the terminal considers that a sensing result for the sensing time is invalid;

(4) the terminal does not perform sensing at the sensing time;

(5) the terminal does not receive a target signal at the sensing time; and (6) the terminal uses a target rule when the terminal excludes a resource by using a sensing result for the sensing time.

The target signal in this embodiment of this application includes at least one of the following: level 1 SCI and level 2 SCI.

The target rule in this embodiment of this application includes one of the following: the terminal increases a priority of a resource within the active time in the second mechanism, the terminal increases an RSRP threshold corresponding to resource pre-emption within the active time, the terminal increases an RSRP threshold corresponding to resource exclusion within the active time, the terminal increases an RSRP threshold corresponding to resource re-evaluation within the active time, the terminal decreases a priority of a resource within the active time, the terminal decreases an RSRP threshold corresponding to resource pre-emption within the active time, the terminal decreases an RSRP threshold corresponding to resource exclusion within the active time, or the terminal decreases an RSRP threshold corresponding to resource re-evaluation within the active time.

In an implementation of this embodiment of this application, the terminal configures a resource allocation manner in a case that at least one of the following preset conditions is met:

a starting point of the sensing time is not within the active time, an end point of the sensing time is not within the active time, the sensing time is not within the active time, a trigger moment of the resource selection time is not within the active time, a pre-emption trigger moment is not within the active time, a re-evaluation trigger moment is not within the active time, an overlapping part between the sensing time and the active time is less than a third preset threshold, a distance between a starting point of the sensing time and a starting point of the active time is less than a fourth preset threshold, a distance between an end point of the sensing time and a starting point of the active time is less than a fifth preset threshold, a distance between the sensing time and a starting point of the active time is less than a sixth preset threshold, a distance between a trigger moment of the resource selection time and a starting point of the active time is less than a seventh preset threshold, a distance between a pre-emption trigger moment and a starting point of the active time is less than an eighth preset threshold, a distance between a re-evaluation trigger moment and a starting point of the active time is less than a ninth preset threshold, a distance between a starting point of the sensing time and an end point of the active time is less than a tenth preset threshold, a distance between an end point of the sensing time and an end point of the active time is less than an eleventh preset threshold, a distance between the sensing time and an end point of the active time is less than a twelfth preset threshold, a distance between a trigger moment of the resource selection time and an end point of the active time is less than a thirteenth preset threshold, a distance between a pre-emption trigger moment and an end point of the active time is less than a fourteenth preset threshold, or a distance between a re-evaluation trigger moment and an end point of the active time is less than a fifteenth preset threshold.

It should be noted that, in this embodiment of this application, that the terminal configures a resource allocation manner includes one of the following: switching from the first mechanism to a third mechanism or switching from the third mechanism to the first mechanism, where the third mechanism includes random selection.

In the case of switching from the first mechanism to the third mechanism, a sensing result within the sensing time in the first mechanism may not be used or referred to, and the terminal may discard this part of sensing time.

In an implementation of this embodiment of this application, the configuring a configuration parameter for the sensing time and configuring a configuration parameter for a second mechanism includes at least one of the following:

(1) configuring the sensing time to be adjacent to the second mechanism, where in a case that the second mechanism is DRX, the configuring the sensing time to be adjacent to the second mechanism may be: when a DRX cycle is set to be an interval of a partial sensing time, setting a start moment of the DRX active time to be an end moment of the partial sensing time, or setting an end moment of the DRX active time to be a start moment of the partial sensing time, so that the sensing time is adjacent to the second mechanism;

(2) extending the active time;

(3) extending the sensing time, where in a case that the second mechanism is DRX, the extending the sensing time may be: when an end moment of the DRX active time and a start moment of the sensing time are each less than a preset value, extending the end moment of the DRX active time to the start moment of the sensing time; or when an end moment of the sensing time and a start moment of the DRX active time is less than a preset value, extending the end moment of the sensing time to the start moment of the DRX active time;

(4) the terminal maintaining monitoring at a time domain location between the active time and the sensing time, where in a case that the second mechanism is DRX, the terminal maintaining monitoring at a time domain location between the active time and the sensing time may be: when an end moment of the DRX active time and a start moment of the sensing time are each less than a preset value, or an end moment of the sensing time and a start moment of the DRX active time are each less than a preset value, the terminal maintaining monitoring at a time domain location between the DRX active time and the sensing time; and (5) configuring a distance between the active times to be greater than or equal to a sixteenth preset threshold.

It should be noted that, the active time may correspond to a same DRX configuration or different DRX configurations.

In an implementation of this embodiment of this application, the extending the active time in this embodiment of this application includes at least one of the following: extending an end point of the active time to a starting point of the sensing time, or extending a starting point of the active time to an end point of the sensing time; and the extending the sensing time in this embodiment of this application includes at least one of the following: extending an end point of the sensing time to a starting point of the active time, or extending a starting point of the sensing time to an end point of the active time.

In an implementation of this embodiment of this application, the method of this embodiment of this application may further include:

maintaining, by the terminal, an active state during the inactive time in a case that the distance between the active times is less than the sixteenth preset threshold.

In other words, in a case that the second mechanism is DRX, when there are a plurality of DRXs, if a distance between continuous DRX active times (which may correspond to the same DRX configuration or different DRX configurations) is less than a preset value, the terminal maintains an active state during the DRX inactive time or an interval (for example, a time between adjacent DRX active times).

In another embodiment of this application, a terminal operation configuration method is further provided. As shown in FIG. 9, the method includes the following steps:

Step 902. A terminal determines a target time, where the target time is indicated by a higher layer of the terminal to a physical layer of the terminal.

Step 904. The terminal executes a target mechanism at the target time, where the target mechanism includes at least one of the following: a first mechanism and a third mechanism; and the first mechanism includes at least one of the following: a sensing time and a resource selection time; and the third mechanism includes random selection.

Through the foregoing step 902 and step 904, after the terminal determines the target time, behaviors of the terminal are specified, so that an inappropriate time for starting a sensing mechanism can be avoided, enabling the terminal to start the sensing mechanism more appropriately, thereby ensuring service reliability.

In an implementation of this embodiment of this application, the target time in this embodiment of this application includes at least one of the following: a first moment and a first time range.

The first moment is a starting moment of an active time in a second mechanism. The second mechanism includes the active time and an inactive time.

It should be noted that, the first mechanism in this embodiment of this application is associated with a periodic service, or the first mechanism is associated with an aperiodic service.

In an implementation of this embodiment of this application, that the target time is indicated by a higher layer of the terminal to a physical layer of the terminal involved in this embodiment of this application includes at least one of the following:

(1) in a case that the higher layer of the terminal proactively determines an indication time of the target time, the target time is indicated by the higher layer of the terminal to the physical layer of the terminal;

(2) in a case that the higher layer of the terminal receives indication information sent by the physical layer of the terminal, the target time is indicated by the higher layer of the terminal to the physical layer of the terminal;

(3) in a case that the higher layer of the terminal receives request information sent by the physical layer of the terminal, the target time is indicated by the higher layer of the terminal to the physical layer of the terminal;

(4) as indicated by a preset indication period, the target time is indicated by the higher layer of the terminal to the physical layer of the terminal; and (5) in a case that a preset condition is met, the target time is indicated by the higher layer of the terminal to the physical layer of the terminal.

The preset condition includes at least one of the following: a measurement result exceeds a seventeenth preset threshold, the terminal needs to transmit an aperiodic service, authorization information obtained by the terminal is associated with a MAC Protocol Data Unit (PDU), and the authorization information obtained by the terminal is associated with a Transport Block (TB).

It should be noted that, the terminal operation configuration method and the energy-saving method for a terminal provided in the embodiments of this application may be performed by a terminal operation configuration apparatus and an energy-saving apparatus for a terminal, or a control module for performing a terminal operation configuration method and an energy-saving method for a terminal in the terminal operation configuration apparatus and the energy-saving apparatus for a terminal. In the embodiments of this application, the terminal operation configuration apparatus and the energy-saving apparatus for a terminal provided in the embodiments of this application are described by using an example in which the terminal operation configuration apparatus and the energy-saving apparatus for a terminal perform the terminal operation configuration method and the energy-saving method for a terminal.

As shown in FIG. 10, a terminal operation configuration apparatus in an embodiment of this application includes:

a first execution module 1002, configured to perform a target operation on at least one of the following time resources: a first overlapping part between a sensing time in a first mechanism and an active time in a second mechanism, and a second overlapping part between the sensing time and an inactive time in the second mechanism, where the first mechanism includes at least one of the following: the sensing time and a resource selection time.

Through the apparatus in this embodiment of this application, behaviors of the terminal are specified in the first overlapping part between the sensing time in the first mechanism and the active time in the second mechanism and the second overlapping part between the sensing time and the inactive time in the second mechanism, so that a reduction in sensing times caused by a case that the sensing times are not in the active time can be avoided.

For example, the first execution module in this embodiment of this application includes at least one of the following:

(1) an execution unit, configured to perform a first target operation on a target resource on the time resource;

(2) a measurement unit, configured to perform a measurement on the time resource;

(3) a first demodulation unit, configured to demodulate level 1 sidelink control information SCI on the time resource;

(4) a second demodulation unit, configured to demodulate level 2 SCI on the time resource, where the level 1 SCI is associated with the level 2 SCI;

(5) a receiving unit, configured to receive a sidelink synchronization signal block SL SSB on the time resource; and (6) a sending unit, configured to send the SL SSB on the time resource.

For example, the target resource in this embodiment of this application includes at least one of the following: a physical sidelink control channel PSCCH, a physical sidelink shared channel PSSCH, a physical sidelink broadcast channel PSBCH, a physical sidelink feedback channel PSFCH, sidelink control information SCI, a synchronization signal block SSB, and a reference signal RS.

For example, the first target operation in this embodiment of this application includes at least one of the following: receiving, sending, monitoring, and demodulating.

For example, the measurement in this embodiment of this application includes at least one of the following: a channel state information reference signal CSI-RS measurement and a reference signal received power RSRP measurement.

For example, the measurement unit in this embodiment of this application is further configured to determine, according to configuration information, whether to perform the measurement at the sensing time.

For example, in a case that the time resource is the second overlapping part, in this embodiment of this application, an operation of the first execution module on the second overlapping part is consistent with an operation of the first execution module on the first overlapping part; or an operation of the first execution module on the second overlapping part is inconsistent with an operation of the first execution module on the first overlapping part.

For example, in a case that the first resource is the second overlapping part, the first execution module in this embodiment of this application includes at least one of the following:

(1) a third demodulation unit, configured to demodulate only level 1 SCI on the second overlapping part;

(2) a first processing unit, configured to skip receiving an SL SSB on the second overlapping part;

(3) a second processing unit, configured to skip sending an SL SSB on the second overlapping part;

(4) a third processing unit, configured to skip performing a measurement on the second overlapping part; and (5) a fourth processing unit, configured to skip performing sensing on the second overlapping part.

For example, in this embodiment of this application, in a case that the time resource is the second overlapping part, a sensing module in the apparatus performs sensing on the time resource in a case that at least one of the following is satisfied:

the sensing time is associated with an aperiodic service, the sensing time is a triggered sensing time, the sensing time is an extended sensing time, the sensing time is associated with pre-emption, the sensing time is associated with re-evaluation, the sensing time is before the active time in the second mechanism, and the sensing time is associated with a resource selection time corresponding to the active time in the second mechanism.

As shown in FIG. 11, an embodiment of this application further provides an energy-saving apparatus for a terminal. The apparatus includes:

a second execution module 112, configured to perform a first operation in at least one of the following manners: network configuration, pre-configuration, determining by the apparatus, indication by another device, and protocol agreement, where the first operation includes at least one of the following: discarding at least some sensing times in a first mechanism, configuring a resource allocation manner, configuring a configuration parameter for the sensing time, and configuring a configuration parameter for a second mechanism; and the first mechanism includes at least one of the following: the sensing time and a resource selection time; and the second mechanism includes the active time and an inactive time.

Through the apparatus in this embodiment of this application, the apparatus can determine to perform the first operation in at least one of the following manners: network configuration, pre-configuration, determining by the apparatus, indication by another device, and protocol agreement. The first operation includes at least one of the following: discarding at least some sensing times in a first mechanism, configuring a resource allocation manner, configuring a configuration parameter for the sensing time, and configuring a configuration parameter for a second mechanism. The energy saving of the terminal is achieved through the selection of the sensing time, the switching of resource allocation mechanisms, and the adjustment of the sensing time, the active time, and the inactive time.

For example, the discarding at least some sensing times in the first mechanism in this embodiment of this application includes at least one of the following: discarding M sensing times after a channel busy rate CBR measurement window when a CBR is lower than a first preset threshold; and discarding N sensing times after the CBR measurement window when a channel occupancy ratio CR is lower than a second preset threshold, where M and N are positive integers.

For example, the discarding at least some sensing times in the first mechanism in this embodiment of this application includes at least one of the following: considering that the sensing time does not exist, considering that the sensing time is invalid, considering that a sensing result for the sensing time is invalid, not performing sensing at the sensing time, not receiving a target signal at the sensing time, and using a target rule when excluding a resource by using a sensing result for the sensing time, where the target signal includes at least one of the following: level 1 SCI and level 2 SCI.

The target rule includes one of the following: increasing a priority of a resource within the active time in the second mechanism, increasing an RSRP threshold corresponding to resource pre-emption within the active time, increasing an RSRP threshold corresponding to resource exclusion within the active time, increasing an RSRP threshold corresponding to resource re-evaluation within the active time, decreasing a priority of a resource within the active time, decreasing an RSRP threshold corresponding to resource pre-emption within the active time, decreasing an RSRP threshold corresponding to resource exclusion within the active time, or decreasing an RSRP threshold corresponding to resource re-evaluation within the active time.

For example, the resource allocation manner is configured in this embodiment of this application in a case that at least one of the following preset conditions is met:

a starting point of the sensing time is not within the active time, an end point of the sensing time is not within the active time, the sensing time is not within the active time, a trigger moment of the resource selection time is not within the active time, a pre-emption trigger moment is not within the active time, a re-evaluation trigger moment is not within the active time, an overlapping part between the sensing time and the active time is less than a third preset threshold, a distance between a starting point of the sensing time and a starting point of the active time is less than a fourth preset threshold, a distance between an end point of the sensing time and a starting point of the active time is less than a fifth preset threshold, a distance between the sensing time and a starting point of the active time is less than a sixth preset threshold, a distance between a trigger moment of the resource selection time and a starting point of the active time is less than a seventh preset threshold, a distance between a pre-emption trigger moment and a starting point of the active time is less than an eighth preset threshold, a distance between a re-evaluation trigger moment and a starting point of the active time is less than a ninth preset threshold, a distance between a starting point of the sensing time and an end point of the active time is less than a tenth preset threshold, a distance between an end point of the sensing time and an end point of the active time is less than an eleventh preset threshold, a distance between the sensing time and an end point of the active time is less than a twelfth preset threshold, a distance between a trigger moment of the resource selection time and an end point of the active time is less than a thirteenth preset threshold, a distance between a pre-emption trigger moment and an end point of the active time is less than a fourteenth preset threshold, or a distance between a re-evaluation trigger moment and an end point of the active time is less than a fifteenth preset threshold.

For example, the configuring a resource allocation manner in this embodiment of this application includes one of the following: switching from the first mechanism to a third mechanism or switching from the third mechanism to the first mechanism, where the third mechanism includes random selection.

For example, the configuring a configuration parameter for the sensing time and configuring a configuration parameter for a second mechanism in this embodiment of this application includes at least one of the following: configuring the sensing time to be adjacent to the second mechanism, extending the active time, extending the sensing time, the terminal maintaining monitoring at a time domain location between the active time and the sensing time, or configuring a distance between the active times to be greater than or equal to a sixteenth preset threshold.

For example, the extending the active time in this embodiment of this application includes at least one of the following: extending an end point of the active time to a starting point of the sensing time, or extending a starting point of the active time to an end point of the sensing time.

For example, the extending the sensing time in this embodiment of this application includes at least one of the following: extending an end point of the sensing time to a starting point of the active time, or extending a starting point of the sensing time to an end point of the active time.

For example, the apparatus in this embodiment of this application further includes: a maintaining module, configured to maintain an active state during the inactive time in a case that the distance between the active times is less than the sixteenth preset threshold.

As shown in FIG. 12, an embodiment of this application further provides a terminal operation configuration apparatus. The apparatus includes:

a determining module 122, configured to determine a target time, where the target time is indicated by a higher layer of a terminal to a physical layer of the terminal; and a third execution module 124, configured to execute a target mechanism at the target time, where the target mechanism includes at least one of the following: a first mechanism and a third mechanism; and the first mechanism includes at least one of the following: a sensing time and a resource selection time; and the third mechanism includes random selection.

Through the apparatus in this embodiment of this application, after the apparatus determines the target time, behaviors of the terminal are specified, so that an inappropriate time for starting a sensing mechanism can be avoided, enabling the terminal to start the sensing mechanism more appropriately, thereby ensuring service reliability.

For example, the target time in this embodiment of this application includes at least one of the following: a first moment and a first time range. The first moment is a starting moment of an active time in a second mechanism. The second mechanism includes the active time and an inactive time.

For example, the first mechanism in this embodiment of this application is associated with a periodic service, or the first mechanism is associated with an aperiodic service.

For example, that the target time is indicated by a higher layer of a terminal to a physical layer of the terminal in this embodiment of this application includes at least one of the following:

(1) in a case that the higher layer of the terminal proactively determines an indication time of the target time, the target time is indicated by the higher layer of the terminal to the physical layer of the terminal;

(2) in a case that the higher layer of the terminal receives indication information sent by the physical layer of the terminal, the target time is indicated by the higher layer of the terminal to the physical layer of the terminal;

(3) in a case that the higher layer of the terminal receives request information sent by the physical layer of the terminal, the target time is indicated by the higher layer of the terminal to the physical layer of the terminal;

(4) as indicated by a preset indication period, the target time is indicated by the higher layer of the terminal to the physical layer of the terminal; and (5) in a case that a preset condition is met, the target e is indicated by the higher layer of the terminal to the physical layer of the terminal.

The preset condition includes at least one of the following: a measurement result exceeds a seventeenth preset threshold, the terminal needs to transmit an aperiodic service, authorization information obtained by the terminal is associated with a Media Access Control protocol data unit MAC PDU, and the authorization information obtained by the terminal is associated with a transport block TB.

The terminal operation configuration apparatus and the energy-saving apparatus for a terminal in the embodiments of this application may be apparatuses, or may be components, integrated circuits, or chips in the terminal. The apparatus may be a mobile terminal, or may be a non-mobile terminal. For example, the mobile terminal may include, but is not limited to the types of terminals 11 listed above. The non-mobile terminal may be a server, a Network Attached Storage (NAS), a Personal Computer (PC), a Television (TV), a teller machine, a self-service machine, or the like. This is not specifically limited in this embodiment of this application.

The terminal operation configuration apparatus and the energy-saving apparatus for a terminal in the embodiments of this application each may be an apparatus with an operating system. The operating system may be an Android operating system, an iOS operating system, or another possible operating system. This is not specifically limited in this embodiment of this application.

The terminal operation configuration apparatus and the energy-saving apparatus for a terminal provided in the embodiments of this application can implement the processes implemented in the method embodiments of FIG. 7 to FIG. 9 and achieve the same technical effects. To avoid repetition, details are not described herein again.

For example, as shown in FIG. 13, an embodiment of this application further provides a communication device 1300, including a processor 1301, a memory 1302, and a program or an instruction stored in the memory 1302 and runnable on the processor 1301. For example, when the communication device 1300 is a terminal, when the program or the instruction is executed by the processor 1301, the processes of the foregoing embodiments of the terminal operation configuration method and the energy-saving method for a terminal are implemented, and the same technical effects can be achieved. When the communication device 1300 is a network side device, during the execution of the program or the instruction by the processor 1301, the processes of the foregoing embodiments of the terminal operation configuration method and the energy-saving method for a terminal are implemented, and the same technical effect can be achieved. To avoid repetition, details are not described herein again.

Figure 14:
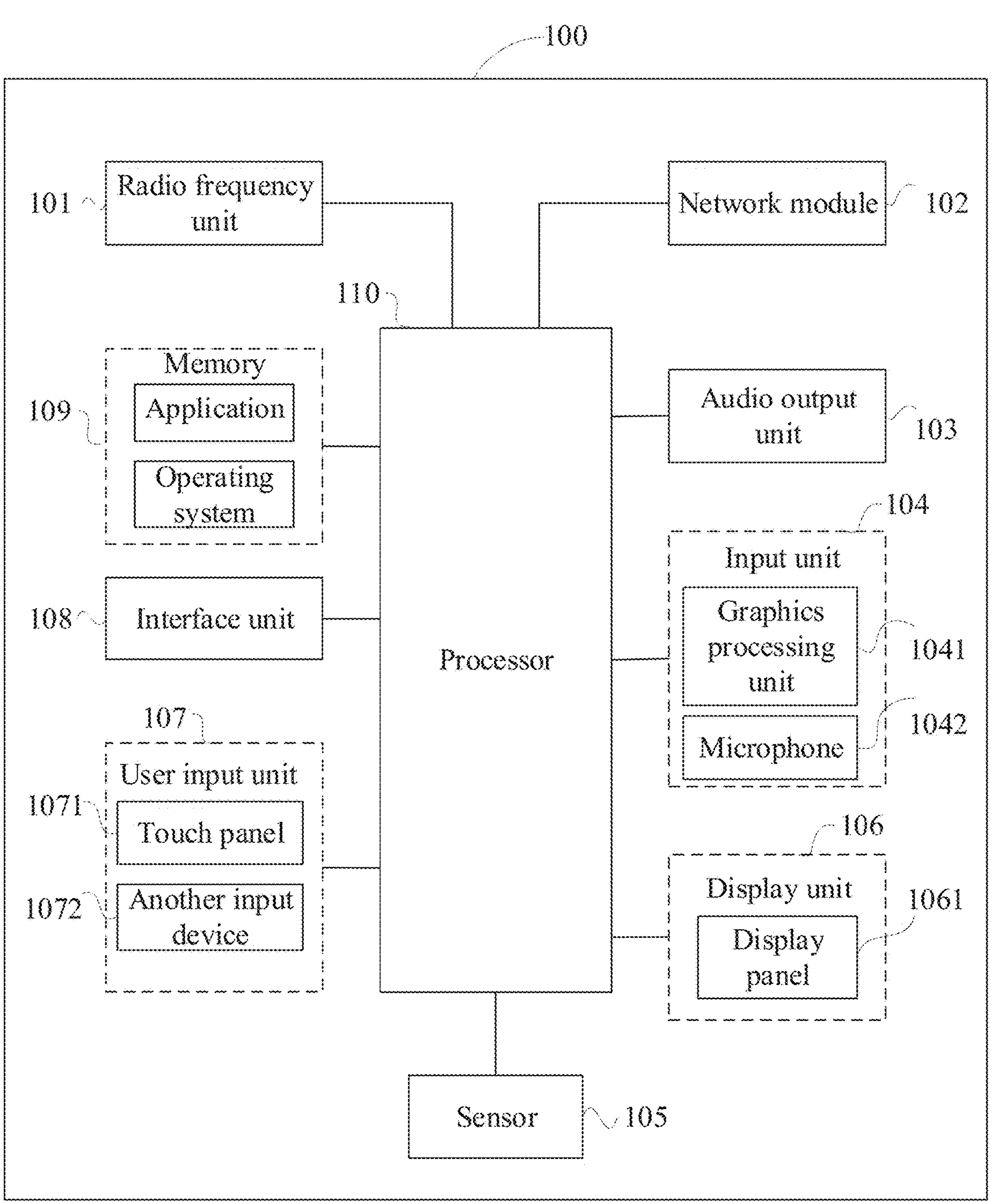
FIG. 14 is a second schematic structural diagram of a terminal according to an embodiment of this application.

FIG. 14 is a schematic diagram of a hardware structure of a terminal that implements an embodiment of this application.

The terminal 100 includes, but is not limited to: a radio frequency unit 101, a network module 102, an audio output unit 103, an input unit 104, a sensor 105, a display unit 106, a user input unit 107, an interface unit 108, a memory 109, a processor 110, and other components.

A person skilled in the art may understand that, the terminal 100 may further include a power supply (such as a battery) for supplying power to each component. The power supply may be logically connected to the processor 110 by using a power management system, thereby implementing functions, such as charging, discharging, and power consumption management, by using the power management system. The terminal structure shown in FIG. 14 does not constitute a limitation on the terminal. The terminal may include more or fewer components than shown, or some components may be combined, or different component arrangements may be used. Details are not described herein again.

It should be understood that, in this embodiment of this application, the input unit 104 may include a Graphics Processing Unit (GPU) 1041 and a microphone 1042. The graphics processing unit 1041 processes image data from static pictures or videos captured by an image capture apparatus (such as a camera) in a video capture mode or an image capture mode. The display unit 106 may include a display panel 1061. The display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional button (such as a sound volume control button or a power button), a trackball, a mouse, or a joystick. Details are not described herein.

In this embodiment of this application, the radio frequency unit 101 receives downlink data from the network side device and then sends the data to the processor 110 for processing; and additionally, sends uplink data to the network side device. Usually, the radio frequency unit 101 includes, but is not limited to, an antenna, at least one amplifier, a transceiver, a coupler, a low noise amplifier, a duplexer, and the like.

The memory 109 may be configured to store a software program or instruction and various data. The memory 109 may mainly include an area for storing programs or instructions and a data storage area. The area for storing programs or instructions may store an operating system, an application or an instruction (such as a sound playing function or an image playing function) required for at least one function, and the like. In addition, the memory 109 may include a high speed random access memory, and may also include a non-volatile memory. The non-volatile memory may be a Read-Only Memory (ROM), a Programmable ROM (PROM), an Erasable PROM (EPROM), an Electrically EPROM (EEPROM), or a flash memory, such as at least one magnetic disk storage device, a flash memory device, or another non-volatile solid-state storage device.

The processor 110 may include one or more processing units. For example, the processor 110 may integrate an application processor and a modem processor. The application processor mainly processes the operating system, a user interface, the application program or instruction, and the like. The modem processor mainly processes wireless communication and is, for example, a baseband processor. It may be understood that, the modem processor may not be integrated into the processor 110.

The processor 110 is configured to perform a target operation on at least one of the following time resources: a first overlapping part between a sensing time in a first mechanism and an active time in a second mechanism, and a second overlapping part between the sensing time and an inactive time in the second mechanism, where the first mechanism includes at least one of the following: the sensing time and a resource selection time.

It should be noted that, the processor 110 may be further configured to perform other method steps in the terminal operation configuration method in the embodiment of FIG. 7, and details are not described herein again.

Through the method steps performed by the processor 110, behaviors of an apparatus are specified in the first overlapping part between the sensing time in the first mechanism and the active time in the second mechanism and the second overlapping part between the sensing time and the inactive time in the second mechanism, so that a reduction in sensing times caused by a case that the sensing times are not in the active time can be avoided.

The processor 110 may be further configured to perform a first operation in at least one of the following manners: network configuration, pre-configuration, determining by the terminal, indication by another device, and protocol agreement, where the first operation includes at least one of the following: discarding at least some sensing times in a first mechanism, configuring a resource al location manner, configuring a configuration parameter for the sensing time, and configuring a configuration parameter for a second mechanism; and the first mechanism includes at least one of the following: the sensing time and a resource selection time: and the second mechanism includes the active time and an inactive time.

It should be noted that, the processor 110 may be further configured to perform other method steps in the terminal operation configuration method in the embodiment of FIG. 8, and details are not described herein again.

Through the method steps performed by the processor 110, it may be determined to perform the first operation in at least one of the following manners: network configuration, pre-configuration, determining by the apparatus, indication by another device, and protocol agreement. The first operation includes at least one of the following: discarding at least some sensing times in a first mechanism, configuring a resource allocation manner, configuring a configuration parameter for the sensing time, and configuring a configuration parameter for a second mechanism. The energy saving of the terminal is achieved through the selection of the sensing time, the switching of resource allocation mechanisms, and the adjustment of the sensing time, the active time, and the inactive time.

The processor 110 may be further configured to determine a target time, where the target time is indicated by a higher layer of a terminal to a physical layer of the terminal; and execute a target mechanism at the target time, where the target mechanism includes at least one of the following: a first mechanism and a third mechanism; and the first mechanism includes at least one of the following: a sensing time and a resource selection time; and the third mechanism includes random selection.

It should be noted that, the processor 110 may be further configured to perform other method steps in the terminal operation configuration method in the embodiment of FIG. 9, and details are not described herein again.

Through the method steps performed by the processor 110, after the target time is determined, behaviors of the terminal are specified, so that an inappropriate time for starting a sensing mechanism can be avoided, enabling the terminal to start the sensing mechanism more appropriately, thereby ensuring service reliability.

An embodiment of this application further provides a readable storage medium. The readable storage medium may be non-transient. The readable storage medium stores a program or an instruction. When the program or the instruction is executed by a processor, the processes of the foregoing embodiments of the terminal operation configuration method and the energy-saving method for a terminal are implemented, and the same technical effect can be achieved. To avoid repetition, details are not described herein again.

The processor may be the processor in the terminal described in the foregoing embodiment. The readable storage medium includes a computer-readable storage medium, such as a computer ROM, a Random Access Memory (RAM), a magnetic disk, an optical disc, and the like.

An embodiment of this application further provides a chip, where the chip includes a processor and a communication interface, the communication interface is coupled to the processor, the processor is configured to run a network side device program or instruction to implement the processes of the foregoing embodiments of the terminal operation configuration method and the energy-saving method for a terminal, and the same technical effects can be achieved. To avoid repetition, details are not described herein again.

It should be understood that, the chip mentioned in this embodiment of this application may also be referred to as a system on a chip, a system chip, a chip system, a system-on-chip, or the like.

An embodiment of this application further provides a computer program product, where the computer program product is stored in a non-transient readable storage medium, and the computer program product is executed by at least one processor to implement the processes of the foregoing embodiments of the terminal operation configuration method and the energy-saving method for a terminal, and the same technical effects can be achieved. To avoid repetition, details are not described herein again.

It should be noted that, the term "include", "comprise", or any other variation thereof in this specification is intended to cover a non-exclusive inclusion, so that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions in the foregoing implementations, a person skilled in the art may clearly learn that the method according to the foregoing embodiment may be implemented by software plus a necessary universal hardware platform, or by using hardware. In some embodiments, the technical solutions of this application essentially, or the part contributing, to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

The embodiments of this application have been described above with reference to the accompanying drawings, but this application is not limited to the foregoing implementations. The foregoing implementations are only illustrative and not restrictive. Under the inspiration of this application, without departing from the purpose of this application and the scope of protection of the claims, a person of ordinary skill in the art can still make many forms, which all fall within the protection of this application.

What is claimed is:

1. A terminal operation configuration method, comprising:

performing, by a terminal, a target operation on the following time resource: a second overlapping part between a sensing time and an inactive time in a second mechanism, wherein a first mechanism comprises at least one of the following: the sensing time or a resource selection time, wherein the performing, by the terminal, a target operation on the time resource comprises at least one of the following:

demodulating, by the terminal, only level 1 Sidelink Control Information (SCI) on the second overlapping part;

skipping receiving, by the terminal, a Sidelink (SL) Synchronization Signal Block (SSB) on the second overlapping part;

skipping performing, by the terminal, a measurement on the second overlapping part; or skipping performing, by the terminal, sensing on the second overlapping part.

2. The terminal operation configuration method according to claim 1, wherein the performing, by the terminal, a target operation on the time resource further comprises at least one of the following:

performing, by the terminal, a first target operation on a target resource on the time resource;

performing, by the terminal, a measurement on the time resource;

demodulating, by the terminal, level 1 SCI on the time resource;

demodulating, by the terminal, level 2 SCI on the time resource, wherein the level 1 SCI is associated with the level 2 SCI;

receiving, by the terminal, an SL SSB on the time resource; or sending, by the terminal, the SL SSB on the time resource.

3. The terminal operation configuration method according to claim 2, wherein the target resource comprises at least one of the following: a Physical Sidelink Control Channel (PSCCH), a Physical Sidelink Shared Channel (PSSCH), a Physical Sidelink Broadcast Channel (PSBCH), a Physical Sidelink Feedback Channel (PSFCH), SCI, an SSB, and a Reference Signal (RS); and the first target operation comprises at least one of the following: receiving, sending, monitoring, or demodulating.

4. The terminal operation configuration method according to claim 2, wherein the measurement comprises at least one of the following: a Channel State Information Reference Signal (CSI-RS) measurement and a Reference Signal Received Power (RSRP) measurement.

5. The terminal operation configuration method according to claim 2, wherein the performing, by the terminal, a measurement on the time resource comprises: determining, by the terminal according to configuration information, whether to perform the measurement at the sensing time.

6. The terminal operation configuration method according to claim 1, wherein an operation of the terminal on the second overlapping part is consistent with an operation of the terminal on a first overlapping part between the sensing time in the first mechanism and an active time in the second mechanism; or an operation of the terminal on the second overlapping part is inconsistent with an operation of the terminal on the first overlapping part.

7. A terminal operation configuration method, comprising:

determining, by a terminal, a target time, wherein the target time is indicated by a higher layer of the terminal to a physical layer of the terminal; and executing, by the terminal, a target mechanism at the target time, wherein the target mechanism comprises a first mechanism wherein the first mechanism comprises a resource selection time, wherein the target time comprises at least one of the following: a first moment, or a first time range, wherein the first moment is a starting moment of an active time in a second mechanism, and the second mechanism comprises the active time and an inactive time.

8. The terminal operation configuration method according to claim 7, wherein the first mechanism is associated with a periodic service, or the first mechanism is associated with an aperiodic service.

9. The terminal operation configuration method according to claim 7, wherein that the target time is indicated by a higher layer of the terminal to a physical layer of the terminal comprises at least one of the following:

when the higher layer of the terminal proactively determines an indication time of the target time, the target time is indicated by the higher layer of the terminal to the physical layer of the terminal;

when the higher layer of the terminal receives indication information sent by the physical layer of the terminal, the target time is indicated by the higher layer of the terminal to the physical layer of the terminal;

when the higher layer of the terminal receives request information sent by the physical layer of the terminal, the target time is indicated by the higher layer of the terminal to the physical layer of the terminal;

as indicated by a preset indication period, the target time is indicated by the higher layer of the terminal to the physical layer of the terminal; or when a preset condition is met, the target time is indicated by the higher layer of the terminal to the physical layer of the terminal.

10. The terminal operation configuration method according to claim 9, wherein the preset condition comprises at least one of the following: that a measurement result exceeds a seventeenth preset threshold, that the terminal needs to transmit an aperiodic service, that authorization information obtained by the terminal is associated with a Media Access Control (MAC) Protocol Data Unit (PDU), or that the authorization information obtained by the terminal is associated with a Transport Block (TB).

11. A terminal, comprising a processor; a memory having a computer program or an instruction stored thereon, wherein the computer program or the instruction, when executed by the processor, causes the processor to perform a terminal operation configuration method, comprising:

performing, by a terminal, a target operation on the following time resource:

a second overlapping part between a sensing time and an inactive time in a second mechanism, wherein a first mechanism comprises at least one of the following: the sensing time or a resource selection time, wherein the performing, by the terminal, a target operation on the time resource comprises at least one of the following:

demodulating, by the terminal, only level 1 Sidelink Control Information (SCI) on the second overlapping part;

skipping receiving, by the terminal, a Sidelink (SL) Synchronization Signal Block (SSB) on the second overlapping part;

skipping performing, by the terminal, a measurement on the second overlapping part; or skipping performing, by the terminal, sensing on the second overlapping part.

12. The terminal according to claim 11, wherein the performing, by the terminal, a target operation on the time resource further comprises at least one of the following:

performing, by the terminal, a first target operation on a target resource on the time resource;

performing, by the terminal, a measurement on the time resource;

demodulating, by the terminal, level 1 SCI on the time resource;

demodulating, by the terminal, level 2 SCI on the time resource, wherein the level 1 SCI is associated with the level 2 SCI;

receiving, by the terminal, an SL SSB on the time resource; or sending, by the terminal, the SL SSB on the time resource.

13. The terminal according to claim 12, wherein the target resource comprises at least one of the following: a Physical Sidelink Control Channel (PSCCH), a Physical Sidelink Shared Channel (PSSCH), a Physical Sidelink Broadcast Channel (PSBCH), a Physical Sidelink Feedback Channel (PSFCH), SCI, an SSB, and a Reference Signal (RS); and the first target operation comprises at least one of the following: receiving, sending, monitoring, or demodulating.

14. The terminal according to claim 12, wherein the measurement comprises at least one of the following: a Channel State Information Reference Signal (CSI-RS) measurement and a Reference Signal Received Power (RSRP) measurement.

15. The terminal according to claim 12, wherein the performing, by the terminal, a measurement on the time resource comprises: determining, by the terminal according to configuration information, whether to perform the measurement at the sensing time.

16. The terminal according to claim 11, wherein an operation of the terminal on the second overlapping part is consistent with an operation of the terminal on a first overlapping part between the sensing time in the first mechanism and an active time in the second mechanism; or an operation of the terminal on the second overlapping part is inconsistent with an operation of the terminal on the first overlapping part.

* * * * *